US012260829B2

(12) United States Patent
Kim et al.

(10) Patent No.: US 12,260,829 B2
(45) Date of Patent: Mar. 25, 2025

(54) DATA DRIVING CIRCUIT AND DISPLAY DEVICE HAVING THE SAME

(71) Applicant: Samsung Display Co., Ltd., Yongin-Si (KR)

(72) Inventors: Yoosung Kim, Yongin-si (KR); Hyunho Lim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/433,453

(22) Filed: Feb. 6, 2024

(65) Prior Publication Data

US 2024/0412698 A1 Dec. 12, 2024

(30) Foreign Application Priority Data

Jun. 9, 2023 (KR) ........................ 10-2023-0074058

(51) Int. Cl.
*G09G 3/3275* (2016.01)

(52) U.S. Cl.
CPC ... *G09G 3/3275* (2013.01); *G09G 2310/0243* (2013.01); *G09G 2310/0289* (2013.01); *G09G 2310/0291* (2013.01); *G09G 2320/02* (2013.01)

(58) Field of Classification Search
None
See application file for complete search history.

(56) References Cited

U.S. PATENT DOCUMENTS 8,508,453 B2 8/2013 Nakayama
8,552,954 B2 * 10/2013 Lee ..................... G09G 3/3648 345/212
9,030,398 B2 5/2015 Chung
2006/0170629 A1 * 8/2006 Baek .................... G09G 3/3275 345/76
2009/0315868 A1 * 12/2009 Yokoyama ........... G09G 3/3688 345/204
2010/0283768 A1 11/2010 Weng et al.
2011/0007068 A1 * 1/2011 Okutani ................. G09G 3/296 345/214
2011/0199353 A1 * 8/2011 Chung ................... G11C 19/00 345/208
2015/0325214 A1 * 11/2015 Ryu ..................... G09G 3/3688 345/99
2019/0189061 A1 * 6/2019 Ryu ..................... G09G 3/3426

FOREIGN PATENT DOCUMENTS

KR 10-1128729 B1 3/2012
KR 10-1503064 B1 3/2015

* cited by examiner

*Primary Examiner* — Dorothy Harris
(74) *Attorney, Agent, or Firm* — Innovation Counsel LLP

(57) ABSTRACT

A data driving circuit of a display device is disclosed that includes a latch circuit to latch a data signal in response to a latch enable signal and to output a first signal, a level shifter to output a second signal obtained by changing a voltage level of the first signal, a digital-analog converter to output a third signal obtained by converting the second signal into an analog signal, an amplifier to output a fourth signal obtained by amplifying the third signal, a switch to output the fourth signal in a form of an image signal, in response to an output enable signal, and a signal generator to generate the latch enable signal and the output enable signal. The signal generator adjusts a start timing of the active duration of the latch enable signal, such that the active duration of the latch enable signal starts, after the inactive duration of the output enable signal starts.

20 Claims, 9 Drawing Sheets

DATA DRIVING CIRCUIT AND DISPLAY DEVICE HAVING THE SAME

CROSS-REFERENCE TO RELATED APPLICATIONS

This application claims priority under 35 U.S.C. § 119 to Korean Patent Application No. 10-2023-0074058 filed on Jun. 9, 2023 in the Korean Intellectual Property Office, the disclosures of which are incorporated by reference herein in their entireties.

BACKGROUND

Embodiments of the present disclosure relate to a display device, and more particularly, relate to a data driving circuit and a display device including the same.

An electronic device, such as a smart phone, a digital camera, a notebook computer, a navigation system, a monitor, and a smart television, that provide an image to a user include a display device to display the image. The display device generates an image and provides the generated image to the user through a display screen.

The display device includes a display panel, a data driving circuit, and a driving controller. The driving controller provides a data signal. The data driving circuit may provide, to the display panel, image signals corresponding to the data signal.

SUMMARY

Embodiments of the present disclosure may provide a data driving circuit showing an improved characteristic in output timing, and a display device including the same.

According to an embodiment, a data driving circuit includes a latch circuit to latch a data signal in response to a latch enable signal and to output a first signal, a level shifter to output a second signal obtained by changing a voltage level of the first signal, a digital-analog converter to output a third signal obtained by converting the second signal into an analog signal, an amplifier to output a fourth signal obtained by amplifying the third signal, a switch to output the fourth signal in a form of an image signal, in response to an output enable signal, and a signal generator to generate the latch enable signal including an active duration and the output enable signal including an inactive duration. The signal generator adjusts a start timing of the active duration of the latch enable signal, such that the active duration of the latch enable signal starts, after the inactive duration of the output enable signal starts.

According to an embodiment, the signal generator may generate the latch enable signal and the output enable signal, such that the active duration of the latch enable signal starts after a first delay time is elapsed from a starting point of the active duration of the output enable signal According to an embodiment, an entire portion of the active duration of the latch enable signal may be entirely overlapped with the inactive duration of the output enable signal.

According to an embodiment, the signal generator may operate in a first operating mode and a second operating mode, the signal generator may maintain the output enable signal to be in an active level for the first operating mode, and the switch may be maintained to be turned on, in response to the output enable signal in the active level.

According to an embodiment, the signal generator may output the output enable signal including the inactive duration and the latch enable signal including the active duration, in response to a clock signal, during the second operating mode.

According to an embodiment, the inactive duration of the output enable signal may be longer than the active duration of the latch enable signal.

According to an embodiment, the latch circuit may latch the data signal at a rising edge of the latch enable signal.

According to an embodiment, the switch may output the fourth signal in a form of the image signal at a rising edge of the output enable signal.

According to an embodiment, a display device may include a display panel, a driving controller to provide a data signal and a clock signal, and a data driving circuit to provide an image signal to the display panel, in response to the data signal and the clock signal. The data driving circuit may include a signal generator to generate a first latch enable signal including an active duration and a first output enable signal including an inactive duration, and a first circuit block to output the image signal corresponding to the data signal, in response to the first latch enable signal and the first output enable signal, and the signal generator may adjust a start timing of the active duration of the first latch enable signal, such that the active duration of the first latch enable signal starts after the inactive duration of the first output enable signal starts.

According to an embodiment, the first circuit block may include a latch circuit to latch a data signal in response to the first latch enable signal, and output a first signal, a level shifter to change a voltage level of the first signal and to output a second signal, a digital-analog converter to output a third signal obtained by converting the second signal into an analog signal, an amplifier to amplify the third signal and to output a fourth signal, and a switch to output the fourth signal in a form of an image signal, in response to the first output enable signal.

According to an embodiment, the latch circuit may latch the data signal at a rising edge of the first latch enable signal.

According to an embodiment, the switch may output the fourth signal in a form of the image signal at a rising edge of the first output enable signal.

According to an embodiment, the signal generator may operate in a first operating mode and a second operating mode, the signal generator may maintain the first output enable signal to be in an active level for the first operating mode, and the switch may be maintained to be turned on, in response to the first output enable signal in the active level.

According to an embodiment, an entire portion of the active duration of the first latch enable signal may be entirely overlapped with the inactive duration of the first output enable signal during the second operating mode.

According to an embodiment, the signal generator may output the first output enable signal including the inactive duration and the first latch enable signal including the active duration, in response to a clock signal during the second operating mode.

According to an embodiment, the inactive duration of the first output enable signal may be longer than the active duration of the first latch enable signal during the second operating mode.

According to an embodiment, the signal generator may generate the first latch enable signal and the first output enable signal, such that the active duration of the first latch enable signal starts after a first delay time is elapsed from a starting point of the inactive duration of the first output enable signal.

According to an embodiment, the display device may further include a first circuit block to output the image signal corresponding to the data signal, in response to the second latch enable signal and the second output enable signal, and the signal generator may additionally generate the second latch enable signal including the active duration and a second output enable signal including the inactive duration.

According to an embodiment, the signal generator may adjust a start timing of the active duration of the second latch enable signal, such that the active duration of the second latch enable signal starts after the inactive duration of the second output enable signal starts.

According to an embodiment, the active duration of the first latch enable signal may be not overlapped with the active duration of the second latch enable signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
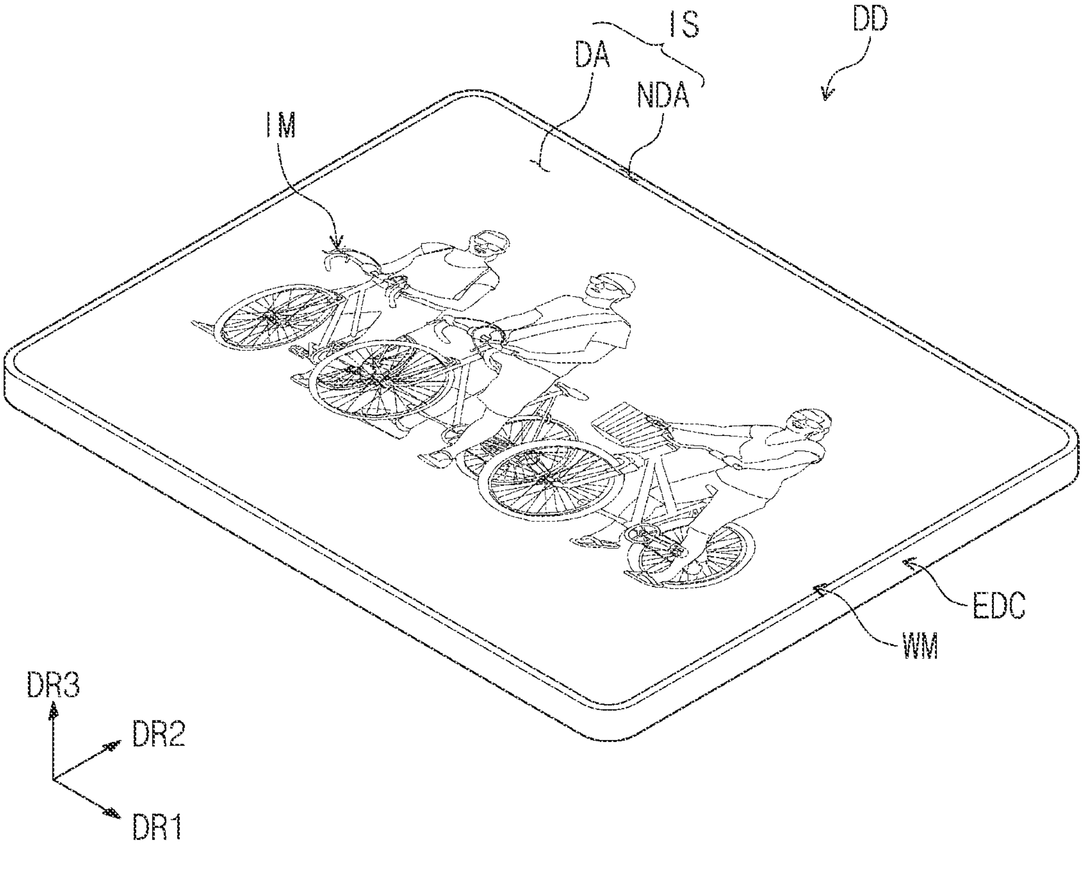
FIG. 1 is a perspective view of a display device according to an embodiment of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numerals will be assigned to the same elements in drawings. In addition, in drawings, thicknesses, proportions, and dimensions of components may be exaggerated to describe the technical features effectively.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," "including," and "having" specify the presence of stated features, numbers, steps, operations, components, parts, or a combination thereof, but do not preclude the presence or addition of one or more other features, numbers, steps, operations, components, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
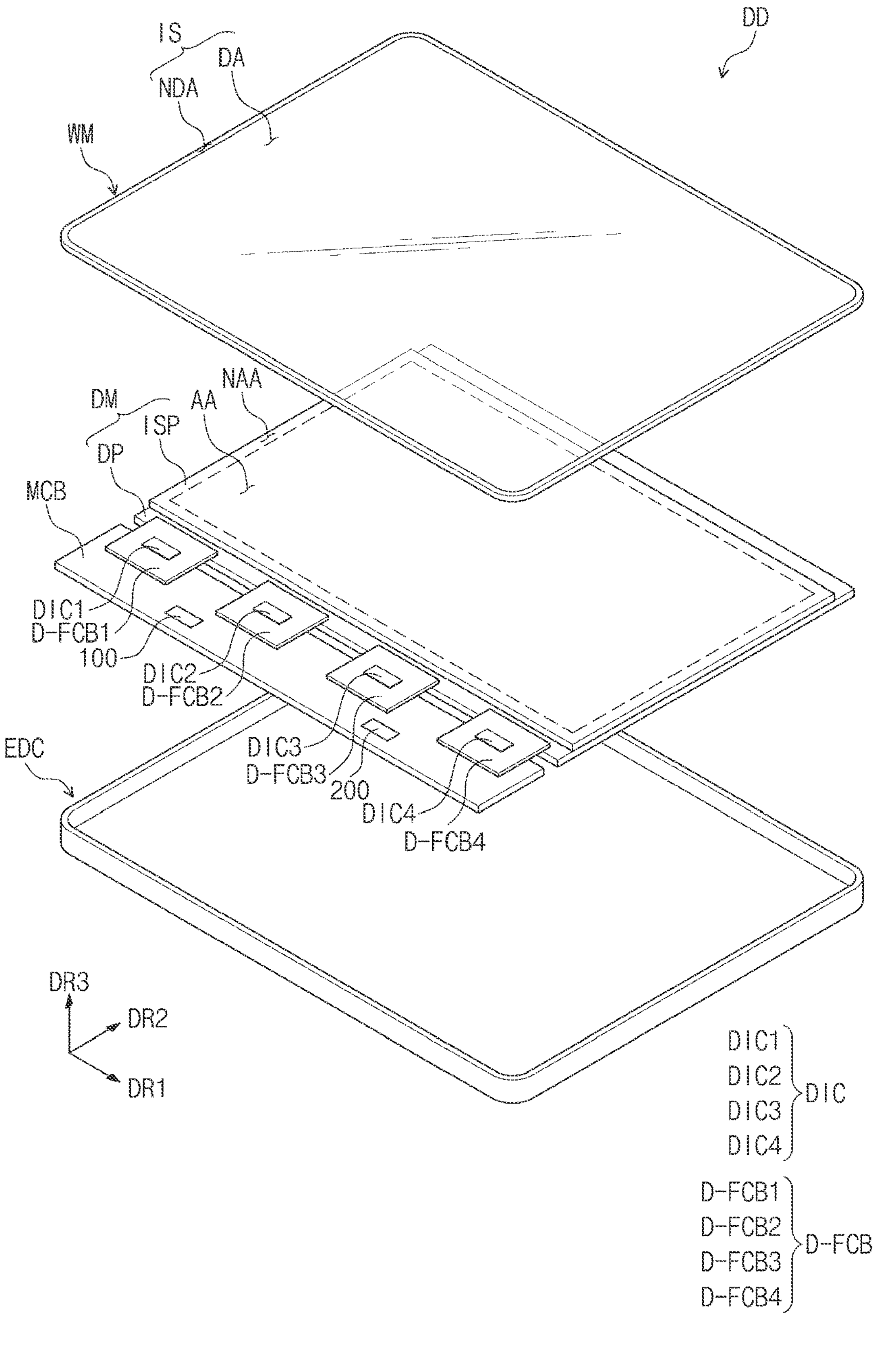
FIG. 2 is an exploded perspective view of a display device, according to an embodiment of the present disclosure.

FIG. 1 is a perspective view of a display device DD according to an embodiment of the present disclosure, and FIG. 2 is an exploded perspective view of the display device DD, according to an embodiment of the present disclosure.

Referring to FIGS. 1 and 2, the display device DD is a device activated in response to an electrical signal. According to the present disclosure, the display device DD may include a large-size display device, such as a television or a monitor, or a smaller or medium-size display device, such as a cellular phone, a tablet PC, a laptop computer, a vehicle navigation, or a game machine. The above examples are provided only for the illustrative purpose, and it is obvious that the display device DD may be applied to any other display device(s) without departing from the concept of the present disclosure. The display device DD has a rectangular shape having a longer side in a first direction DR1, and a shorter side in a second direction DR2 crossing the first direction DR1. However, the shape of the display device DD is not limited thereto, but various display devices DD having various shapes may be provided. The display device DD may display an image IM, in a third direction DR3, on a display surface IS parallel to the first direction DR1 and the second direction DR2. The display surface IS to display the image IM may correspond to a front surface of the display device DD.

According to an embodiment, a front surface (or top surfaces) and a back surface (or bottom surfaces) of members are defined based on a direction that the image IM is displayed. The front surface and the back surface are opposite to each other in the third direction DR3, and the normal direction to the front surface and the back surface may parallel to the third direction DR3.

The distance between the front surface and the back surface in the third direction DR3 may correspond to the thickness of the display device DD in the third direction DR3. Meanwhile, the directions indicated by the first to third directions DR1, DR2, and D3 are relative concepts and switched another direction.

The display device DD may sense an external input applied from the outside. The external input may include various inputs applied from an outside of the display device DD. According to an embodiment of the present disclosure, the display device DD may sense an external input of the user, which is applied from the outside. The external input of the user may include any one of various external inputs, such as a part of a body of the user, light, heat, or pressure, or the combination thereof. In addition, the display device DD may sense the external input of the user, which is applied to the side surface or the back surface of the display device DD depending on the structures of the display device DD, and is not limited to any one embodiment. According to an embodiment of the present disclosure, the external input may include an input (for example, a stylus pen, an active pen, a touch pen, an electronic pen, or an e-pen).

The display surface IS of the display device DD may be divided into a display region DA and a non-display region NDA. The display region DA may be a region to display the image IM. The user views the image IM through the display region DA. According to the present embodiment, the display region DA is illustrated as a rectangular shape rounded in vertexes. However, the shape is provided for the illustrative purpose. For example, the display region DA may have various shapes, and not limited to any one embodiment.

The non-display region NDA surrounds the display region DA. The non-display region NDA may have a specific color. The non-display region NDA may surround the display region DA. Accordingly, a shape of the display region DA may be defined substantially by the non-display region NDA. However, the above shape of the display region DA is provided for the illustrative purpose. For example, the non-display region NDA may be disposed to be adjacent to only one side of the display region DA or may be omitted. The display device DD according to an embodiment of the present disclosure may include various embodiments, and the present disclosure is not limited to any embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include an emissive-type display panel. For example, the display panel DP may be an organic light emitting display panel, an inorganic light emitting display panel, or a quantum dot light emitting display panel. The light emitting layer of the organic light emitting display layer may include an organic light emitting material. A light emitting layer of the inorganic light emitting display panel may include an inorganic light emitting material. A light emitting layer of the quantum dot light emitting display panel may include a quantum dot and a quantum rod. Hereinafter, the data panel DP according to the present embodiment will be referred to as the organic light emitting display panel.

The display panel DP may output the image IM, and the output image IM may be displayed on the display surface IS.

The input sensing layer ISP may be disposed on the display panel DP to sense the eternal input. The input sensing layer ISP may be directly disposed on the display panel DP. According to an embodiment of the present disclosure, the input sensing layer ISP may be formed on the display panel DP through a subsequent process. In other words, when the input sensing layer ISP is directly disposed on the display panel DP, an internal adhesive film (not illustrated) is not interposed between the input sensing layer ISP and the display panel DP. However, the internal adhesive film may be disposed between the input sensing layer ISP and the display panel DP. In this case, the input sensing layer ISP and the display panel DP are not fabricated through the subsequent processes. In other words, after fabricating the input sensing layer ISP through a process separate from that of the display panel DP, the input sensing layer ISP may be fixed on a top surface of the display panel DP through the inner adhesive film.

The window module WM may include a transparent material to output the image IM. For example, the window module WM may include glass, sapphire, or plastic. Although the window module WM is illustrated in a single layer, the present disclosure is not limited thereto. For example, the window module WM may include a plurality of layers.

Meanwhile, although not illustrated, the non-display region NDA of the display device DD described above may be provided as a region obtained as a material including a specific color is substantially printed on one region of the window WM. According to an embodiment of the present disclosure, the window WM may include a light blocking pattern to define the non-display region NDA. The light blocking pattern serving as an organic layer having a color may be formed in a coating scheme.

The window module WM may be coupled to the display module DM through an adhesive film. According to an embodiment of the present disclosure, the adhesive film may include an optically clear adhesive film (OCA). However, the adhesive film is not limited thereto, but may include a typical adhesive agent and adhesion agent. For example, the adhesive film may include optically clear resin (OCR), or a pressure sensitive adhesive film (PSA).

An anti-reflection layer may be further disposed between the window WM and the display module DM. The anti-reflection layer reduces a reflective index of external light incident from an upper portion of the window WM. According to an embodiment of the present disclosure, the anti-reflection layer may include a phase retarder and a polarizer. The phase retarder may also have a film type or a liquid crystal coating type. The polarizer may also have a film type or a liquid crystal coating type. The film type polarizer may include a stretched synthetic resin film, and the liquid crystal coating type polarizer may include liquid crystals aligned in a specific array. The retarder and the polarizer may be implemented with one polarization film.

The display module DM may display the image IM, and may transmit/receive information on an external input, in response to an electrical signal. The display module DM may be defined with an active region AA and a non-active region NAA. The active region AA may be defined as a region through which an image provided from the display region DA is output. In addition, the active region AA may be defined as a region in which the input sensing layer ISP senses the external input applied from the outside.

The non-active region NAA may be adjacent to the active region AA. For example, the non-active region NAA may surround the active region AA. However, the shape is provided for the illustrative purpose. For example, the non-active region NAA may have various shapes, and not limited to any one embodiment. According to an embodiment, the active region AA of the display module DM may correspond to at least a portion of the display region DA.

The display device DD may further include a main circuit board MCB, flexible circuit films D-FCB, data driving circuits DIC, a driving controller 100, and a voltage generator 200. The main circuit board MCB may be connected with the flexible circuit films D-FCB and may be electrically connected to the display panel DP. The flexible circuit films D-FCB is connected to the display panel DP to electrically connect the display panel DP to the main circuit board MCB. The main circuit board MCB may include a plurality of driving devices. The plurality of driving devices may include a circuit unit to drive the display panel DP. The data driving circuits DIC may be mounted on the flexible circuit films D-FCB.

According to an embodiment of the present disclosure, the flexible circuit films D-FCB may include a first flexible circuit film D-FCB1, a second flexible circuit film D-FCB2, a third flexible circuit film D-FCB3, and a fourth flexible circuit film D-FCB4. The data driving circuits DIC may include a first data driving circuit DIC1, a second data driving circuit DIC2, a third data driving circuit DIC3, and a fourth data diving circuit DIC4. The first to fourth flexible circuit films D-FCB1, D-FCB2, D-FCB3, and D-FCB4 are disposed to be spaced apart from each other in the first direction DR1, and connected to the display panel DP to electrically connect the display panel DP to the main circuit board MCB.

According to an embodiment, each of first to fourth data driving circuits DIC1 to DIC4 may be implemented with an integrated circuit. The first to fourth data driving circuits DIC1 to DIC4 may be mounted in the first to fourth flexible circuit films D-FCB1, D-FCB2, D-FCB3, and D-FCB4, respectively. However, the present disclosure is not limited thereto. For example, the display panel DP may be electrically connected to the main circuit board MCB through one flexible circuit film, and only one data driving circuit may be mounted on one flexible circuit film. In addition, the number of flexible circuit films included in the display device DD may be variously changed.

Although FIG. 2 illustrates that the first to fourth data driving circuits DIC1 to DIC4 may be mounted in the first to fourth flexible circuit films D-FCB1, D-FCB2, D-FCB3, and D-FCB4, respectively, the present disclosure is not limited thereto. For example, the first to fourth data driving circuits DIC1 to DIC4 may be directly mounted on the display panel DP. In this case, a portion of the display panel DP, in which the first to fourth data driving circuits DIC1 to DIC4 are mounted, may be bent and disposed on a rear surface of the display module DM. For example, the first to fourth data driving circuits DIC1 to DIC4 may be directly mounted on the main circuit board MCB.

The input sensing layer ISP may be electrically connected with the main circuit board MCB through the flexible circuit board D-FCB However, the present disclosure is not limited thereto. In other words, the display module DM may further include an additional flexible film to electrically connect the input sensing layer IS to the main circuit board MCB.

According to an embodiment, the driving controller 100 and the voltage generator 200 may be disposed on the main circuit board MCB. The driving controller 100 and the voltage generator 200 may be electrically connected to the display panel DP through the main circuit board MCB, and the flexible circuit films D-FCB.

The display device DD further includes an external case EDC that receives the display module DM. The external case EDC may be coupled to the window WM to define the outer appearance of the display device DD. The external case EDC may absorb the impact applied from the outside and may prevent a foreign material/moisture from being infiltrated into the display module DM to protect components received in the external case EDC. Meanwhile, according to an embodiment, the external case EDC may be provided in the form that a plurality of receiving members are assembled.

Figure 3:
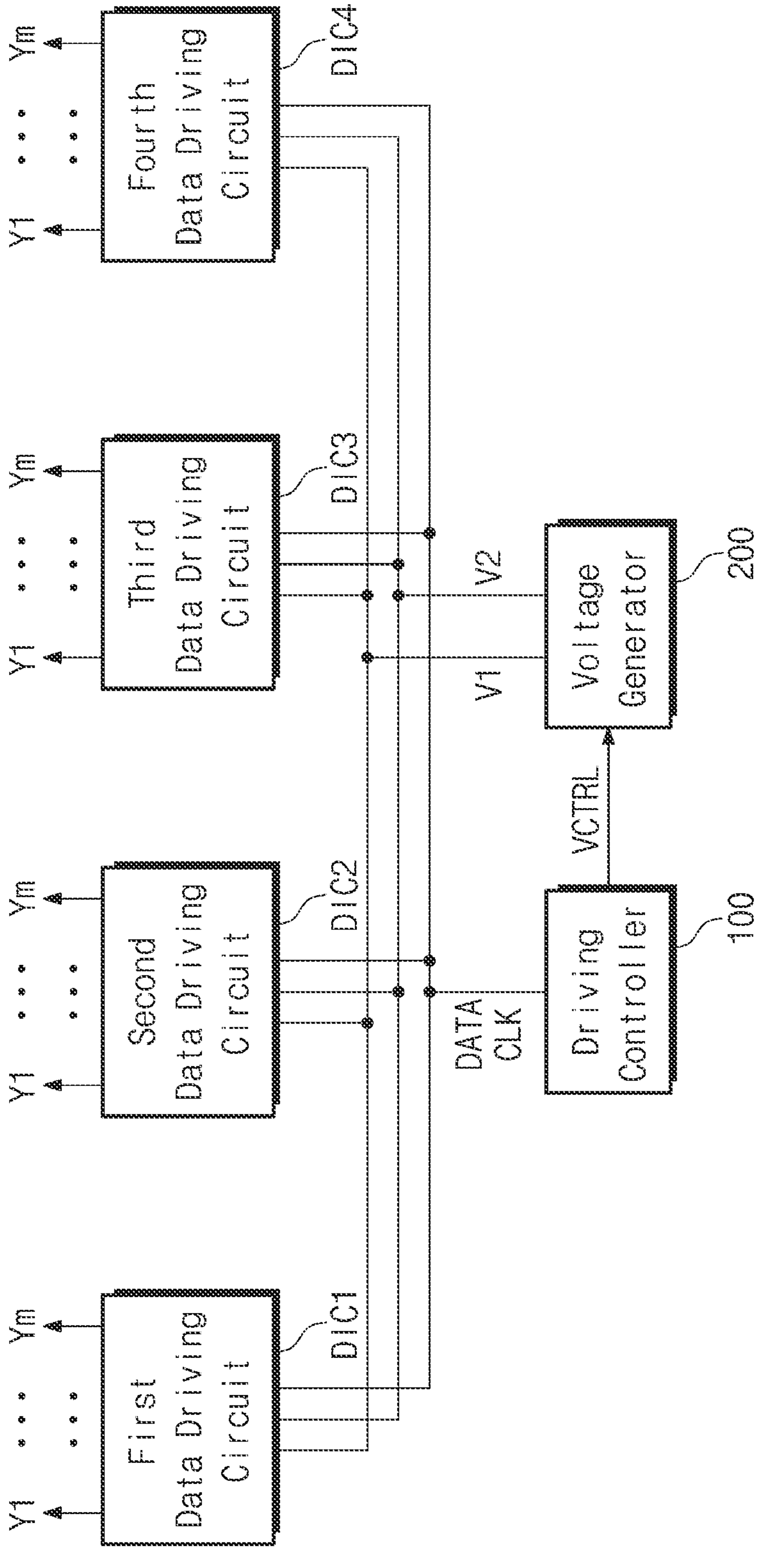
FIG. 3 is a block diagram illustrating the connection relationship among a driving controller, a voltage generator, and first to fourth data driving circuits, according to an embodiment of the present disclosure.

FIG. 3 is a block diagram illustrating the connection relationship among the driving controller 100, the voltage generator 200, and the first to fourth data driving circuits DIC1 to DIC4, according to an embodiment of the present disclosure;

Referring to FIG. 3, the driving controller 100 provides a data signal DATA and a clock signal CLK to the first to fourth data driving circuits DIC1 to DIC4.

The driving controller 100 may provide a voltage control signal VCTRL to the voltage generator 200. The voltage generator 200 may provide a first voltage V1 and a second voltage V2 to the first to fourth data driving circuits DIC1 to DIC4, in response to the voltage control signal VCRL. According to an embodiment, the first voltage V1 and the second voltage V2 may be voltages necessary for the operations of the first to fourth data driving circuits DIC1 to DIC4, and the display panel DP.

Each of the first to fourth data driving circuits DIC1 to DIC4 may receive the data signal DATA and the clock signal CLK from the driving controller 100 to output image signals Y1 to Ym (in this case, "m" is a positive integer equal to or greater than "1").

Although FIG. 3 illustrates that the first to fourth data driving circuits DIC1 to DIC4 output 'm' number of images signals Y1 to Ym, the present disclosure is not limited thereto. According to an embodiment, the first to fourth data driving circuits DIC1 to DIC4 may output data signals in different number.

Figure 4:
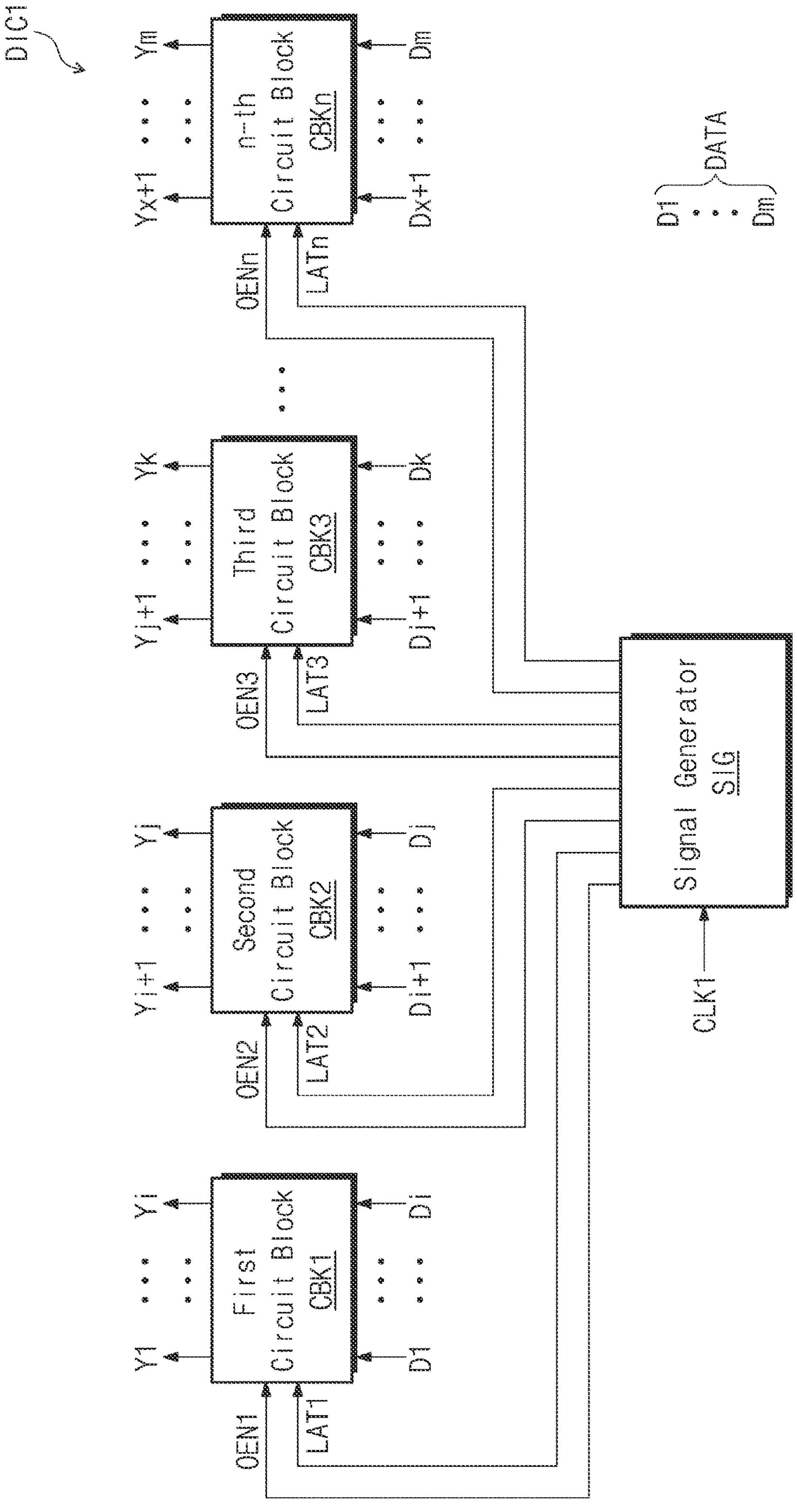
FIG. 4 is a block diagram illustrating a first data driving circuit.

FIG. 4 is a block diagram illustrating a first data driving circuit DIC1.

Referring to FIG. 4, the first data driving circuit DIC1 includes a first circuit block to an n-th circuit block CBK1, CBK2, CBK3, . . . , and CBKn, and a signal generator SIG (in which "n" is a positive integer greater than "1"). Although FIG. 4 illustrates that the first data driving circuit DIC1 includes "n" number of circuit blocks, that is, the first to n-th circuit blocks CBK1, CBK2, CBK3, . . . , and CBKn, the present disclosure is not limited thereto. The first data driving circuit DIC1 may include at least one circuit block.

The signal generator SIG receives the first clock signal CLK1 to generate output enable signals OEN1, OEN2, OEN3, . . . , and OENn, and latch enable signals LAT1, LAT2, LAT3, . . . , and LATn. According to an embodiment, the first clock signal CLK1 may be a signal included in the clock signal CLK provided from the driving controller 100 illustrated in FIG. 3. According to an embodiment, the first to fourth data driving circuits DIC1 to DIC4 illustrated in FIG. 3 may operate in synchronization with mutually different clock signals in the clock signal CLK.

According to an embodiment, the signal generator SIG generates output enable signals OEN1, OEN2, OEN3, . . . , and OENn, and latch enable signals LAT1, LAT2, LAT3, . . . , and LATn, in response to the first clock signal CLK1.

The first circuit block CBK1 may output image signals Y1 to Yi corresponding to the data signals D1 to Di, in response to the output enable signal OEN1 and the latch enable signal LAT1.

The second circuit block CBK2 may output image signals Yi+1 to Yj corresponding to the data signals Di+1 to Dj, in response to the output enable signal OEN2 and the latch enable signal LAT2.

The third circuit block CBK3 may output image signals Yj+1 to Yk corresponding to the data signals Dj+1 to Dk, in response to the output enable signal OEN3 and the latch enable signal LAT3.

The n-th circuit block CBKn may output image signals Yx+1 to Ym corresponding to the data signals Dx+1 to Dm, in response to the output enable signal OENn and the latch enable signal LATn. In this case, each of "i", "j", "k", "m", "n", and "x" is a positive integer greater than "1".

The data signals DATA, that is, data signals D1 to Dm provided to the first to n-th circuit blocks CBK1, CBK2, CBK3, . . . and, CBKn may be provided from the driving controller 100 illustrated in FIG. 3.

According to an embodiment, the first data driving circuit DIC1 may simultaneously output image signals Y1 to Ym corresponding to the data signals D1 to Dm. However, when the image signals Y1 to Ym are simultaneously output, noise may be included in the image signals Y1 to Ym due to Electro Magnetic Interference (EMI).

According to an embodiment, the signal generator SIG in the first data driving circuit DIC1 may generate the output enable signals OEN1, OEN2, ONE3, . . . , and OENn and the latch enable signals LAT1, LAT2, LAT3, . . . , and LATn such that the first to n-th circuit blocks CBK1, CBK2, CBK3, . . . , and CBKn alternately operate.

Figure 5:
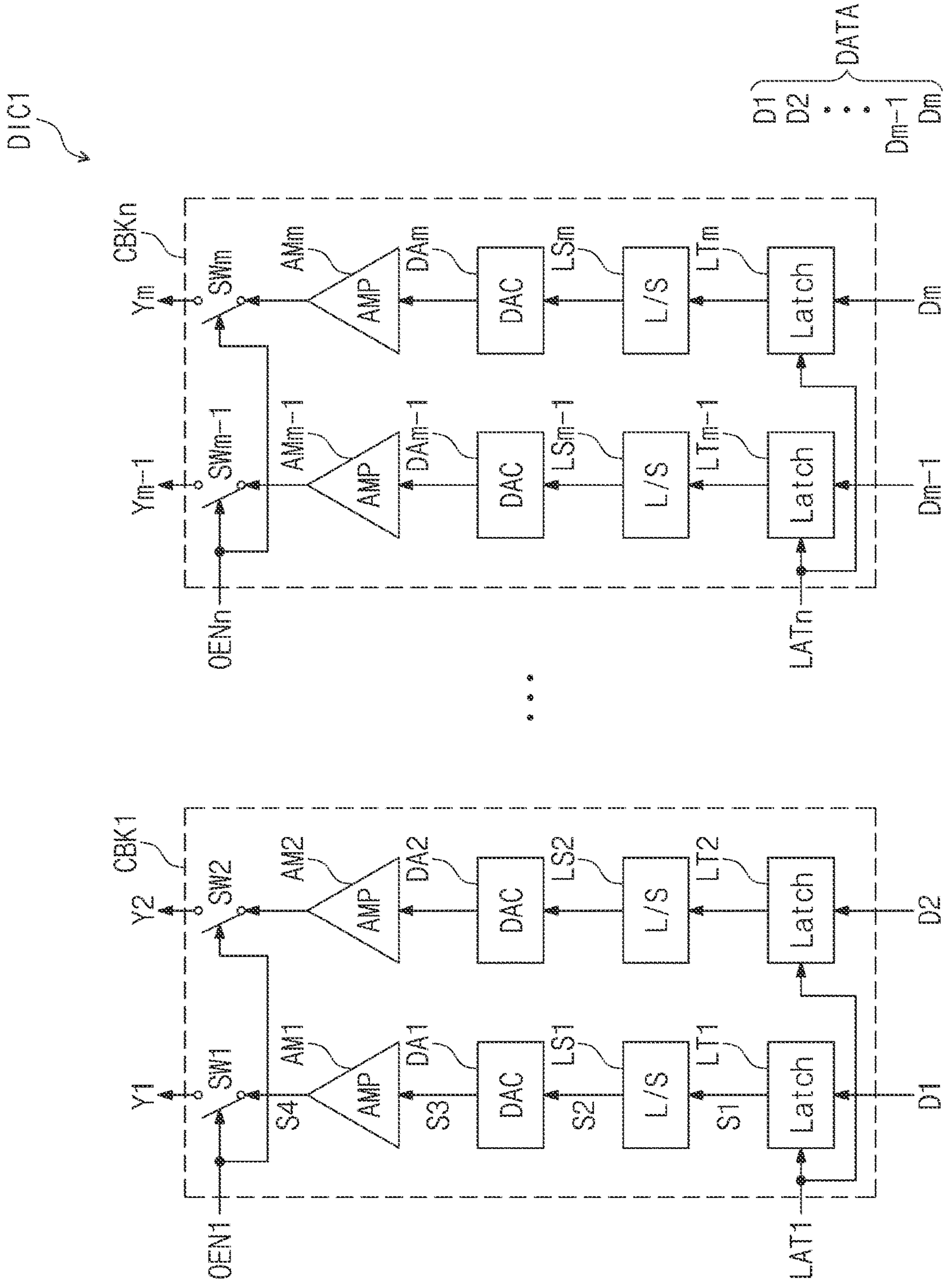
FIG. 5 is a view illustrating a portion of the first circuit block and a portion of the n-th circuit block illustrated in FIG. 4.

FIG. 5 is a view illustrating a portion of the first circuit block and a portion of the n-th circuit block illustrated in FIG. 4.

Referring to FIG. 5, the first circuit block CBK1 includes latches LT1 and LT2, level shifters LS1 and LS2, digital-analog converters DA1 and DA2, amplifiers AM1 and AM2, and switches SW1 and SW2.

The data signal D1 may be output in the form of the image signal Y1 by the latch LT1, the level shifter LS1, the digital-analog converter DA1, the amplifier AM1, and the switch SW1. The data signal D2 may be output in the form of the image signal Y2 by the latch LT2, the level shifter LS2, the digital-analog converter DA2, the amplifier AM2, and the switch SW2.

FIG. 5 illustrates some circuit components to receive the data signals D1 and D2 and to output the image signals Y1 and Y2 in the first circuit block CBK1 illustrated in FIG. 4. The first circuit block CBK1 illustrated in FIG. 4 may include circuits to receive the data signals D1 to Di and to output the image signals Y1 to Yi.

The latch LT1 latches the data signal D1, and outputs a first signal S1 in response to the latch enable signal LAT1. The level shifter LS1 outputs a second signal S2 obtained by changing a voltage level of the first signal S1. The digital-to-analog converter DA1 converts the second signal S2, which is a digital signal, into a third signal S3, which is an analog signal, to be output. The amplifier AM1 amplifies the third signal S3 and outputs a fourth signal S4. The switch SW1 outputs the image signal Y1 in response to the output enable signal OEN1.

The operation of the latch LT2, the level shifter LS2, the digital-analog converter DA2, the amplifier AM2, and the switch SW2 is the same as the latch LT1, the level shifter LS1, the digital-analog converter DA1, the amplifier AM1, and the switch SW1. Accordingly, the details thereof will be omitted to avoid redundancy.

The n-th circuit block CBKn includes latches LTm-1 and LTm, level shifters LSm-1 and LSm, digital-analog converters DAm-1 and DAm, amplifiers AMm-1 and AMm, and switches SWm-1 and SWm.

The data signal Dm-1 may be output in the form of the image signal Ym-1 by the latch LTm-1, the level shifter LSm-1, the digital-analog converter Dam-1, the amplifier AMm-1, and the switch SWm-1.

The operation of the latch LTm-1, the level shifter LSm-1, the digital-analog converter DAm-1, the amplifier AMm-1, and the switch SWm-1 is the same as the operation the latch LT1, the level shifter LS1, the digital-analog converter DA1, the amplifier AM1, and the switch SW1. Accordingly, the details thereof will be omitted to avoid redundancy.

The data signal Dm may be output in the form of the image signal Ym by the latch LTm, the level shifter LSm, the digital-analog converter DAm, the amplifier AMm, and the switch SWm.

The operation of the latch LTm, the level shifter LSm, the digital-analog converter DAm, the amplifier AMm, and the switch SWm is the same as the operation the latch LT1, the level shifter LS1, the digital-analog converter DA1, the amplifier AM1, and the switch SW1. Accordingly, the details thereof will be omitted to avoid redundancy.

FIG. 5 illustrates some circuit components to receive the data signals Dm-1 and Dm and to output the image signals Ym-1 and Ym in the n-th circuit block CBKn illustrated in FIG. 4. The n-th circuit block CBKn illustrated in FIG. 4 may include circuits to receive the data signals Dx+1 to Dm and to output the image signals Yx+1 to Ym.

According to an embodiment, the latches LT1 and LT2 in the first circuit block CBK1 operate in response to the same latch enable signal LAT1. The switches SW1 and SW2 in the first circuit block CBK1 operates in response to the same output enable signal OEN1.

Figure 6:
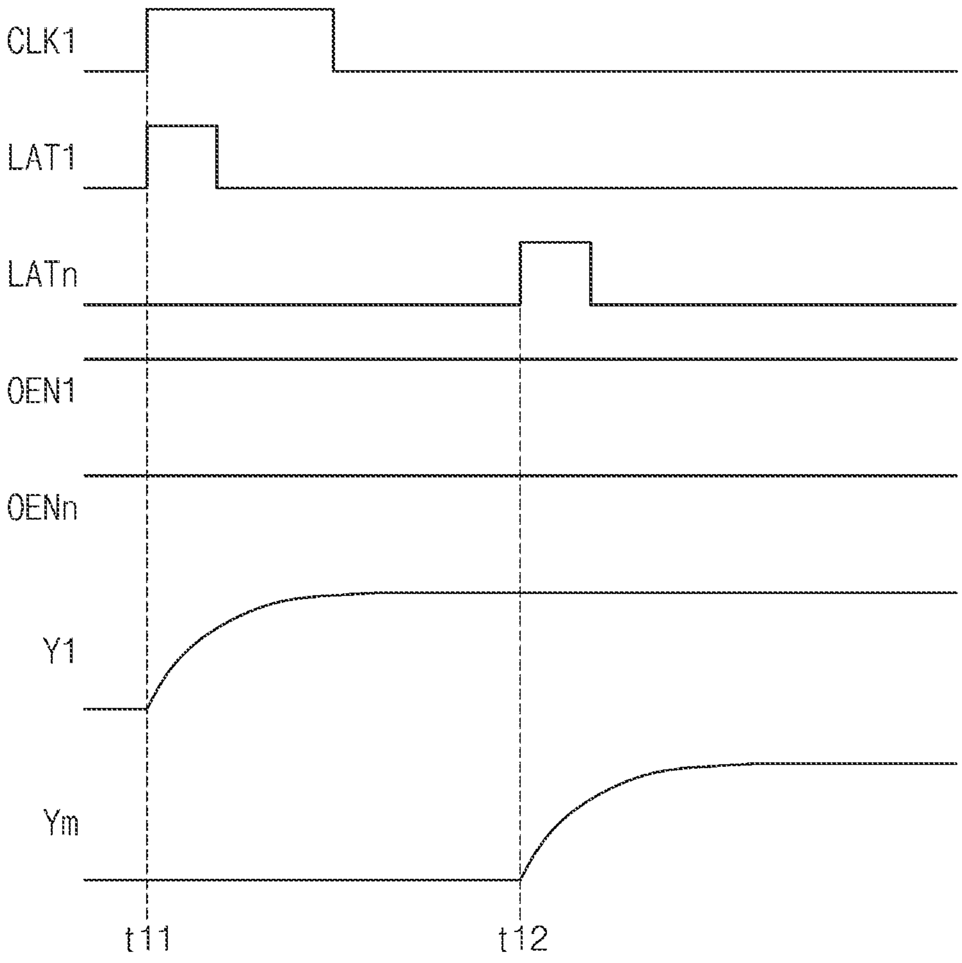
FIG. 6 is a timing diagram illustrating the operation of the first data driving circuit illustrated in FIG. 5 during the first operating mode.

According to an embodiment, the latches LTm-1 and LTm in the n-th circuit block CBKn operate in response to the same latch enable signal LATn. According to an embodiment, the switches SWm-1 and SWm in the n-th circuit block CBKn operates in response to the same output enable signal OENn FIG. 6 is a timing diagram illustrating the operation of the first data driving circuit DIC1 illustrated in FIG. 5 during the first operating mode;

Referring to FIGS. 4, 5, and 6, the signal generator SIG generates latch enable signals LAT1 and LATn and output enable signals OEN1 and OENn, in response to the clock signal CLK1.

According to an embodiment, the output enable signals OEN1 and OENn may be maintained to be in an active level (e.g., a high level) during the first operation mode. When the output enable signals OEN1 and OENn are at a high level, the switches SW1 and SWm are maintained to be turned on.

According to an embodiment, when the latch enable signal LAT1 transitions to an active level (e.g., a high level) at the 11th time point t11, the data signal D1 may be output in the form of the image signal Y1 through the latch LT1, the level shifter LS1, the digital-analog converter DA1, the amplifier AM1, and the switch SW1.

According to an embodiment, when the latch enable signal LATn transitions to an active level (e.g., a high level) at the 12th time point t12, the data signal Dm may be output in the form of an image signal Ym through the latch LTm, the level shifter LSm, the digital-analog converter DAm, the amplifier AMm, and the switch SWm.

In other words, the first data driving circuit DIC1 may output the image signals Y1 and Ym m at a rising edge (or a rising edge of the clock signal CLK1) of the latch enable signals LAT1 and LATn) during the first operating mode.

Figure 7:
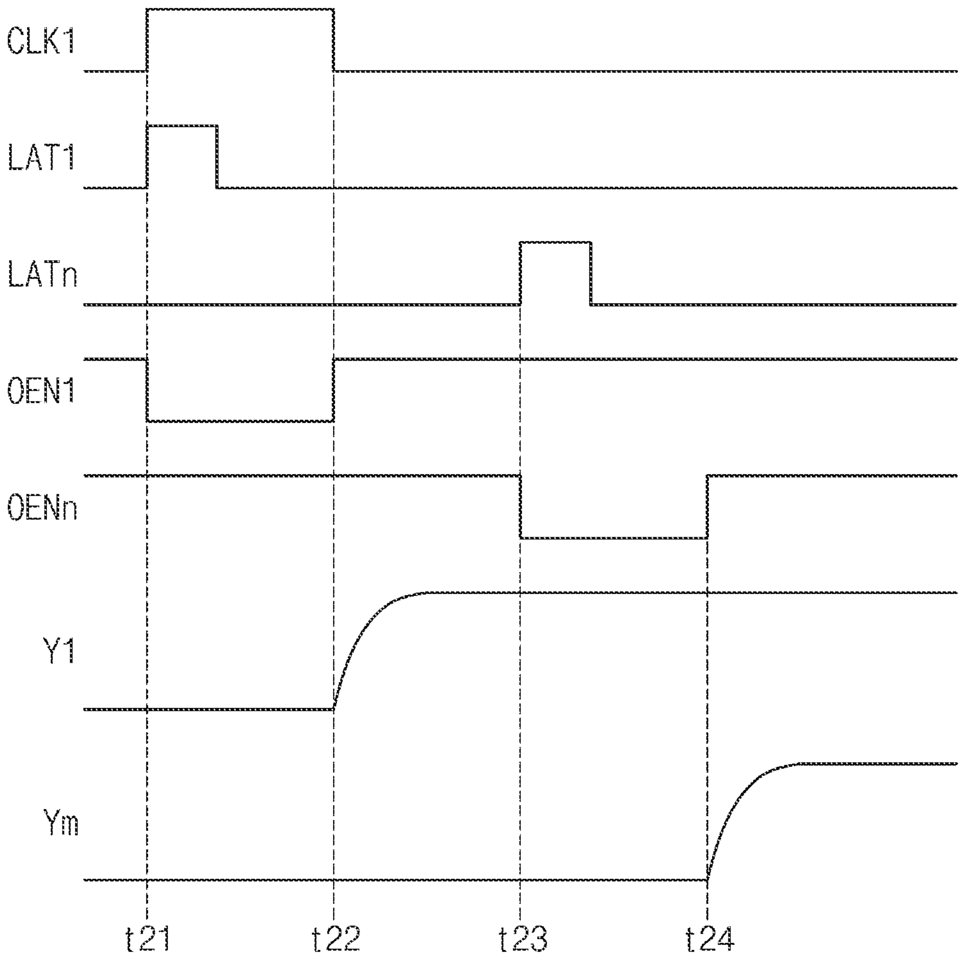
FIG. 7 is a timing diagram illustrating the operation of the first data driving circuit illustrated in FIG. 5 during the second operating mode.

FIG. 7 is a timing diagram illustrating the operation of the first data driving circuit DIC1 illustrated in FIG. 5 during the second operating mode.

Referring to FIGS. 4, 5, and 7, the signal generator SIG generates the latch enable signals LAT1 and LATn and the output enable signals OEN1 and OENn, in response to the clock signal CLK1, during the second operating mode.

According to an embodiment, when the latch enable signal LAT1 transitions to the active level (e.g., a high level) at a 21st time point t21, the latch LT1 outputs the data signal D1 in the form of the first signal S1. The level shifter LS1 outputs a second signal S2 corresponding to the first signal S1. The digital-analog converter DA1 outputs a third signal S3 corresponding to the second signal S2. The amplifier AM1 outputs a fourth signal S4 corresponding to the third signal.

The output enable signal OEN1 transitions to an inactive level (e.g., a low level) at the 21st time point t21. While the output enable signal OEN1 is at an inactive level, the switch SW1 is maintained to be turned off.

When the output enable signal OEN1 transitions from the inactive level (e.g., a low level) to an active level (e.g., a high level) at the 22nd time point t22, the switch SW1 is turned on and the fourth signal S4 from the amplifier AM1 may be output in the form of the image signal Y1.

According to an embodiment, when the output enable signal OENn transitions from the inactive level (e.g., the low level) to the active level (e.g., the high level) at a 24th time point t24 after the latch enable signal LATn transitions to the active level (e.g., the high level) at a 23rd time point t23, the switch SWm may be turned on such that the data signal Dm may be output in the form of the image signal Ym.

In other words, the first data driving circuit DIC1 may output the image signals Y1 and Ym m at a rising edge (or a falling edge of the clock signal CLK1) of the latch enable signals OEN1 and OENn during the second operating mode.

The signal generator illustrated in FIG. 4 may output the latch enable signals LAT1 to LATn and the output enable signals OEN1 to OENn, depending on a preset operating mode of the first operating mode and the second operating mode.

Figure 8:
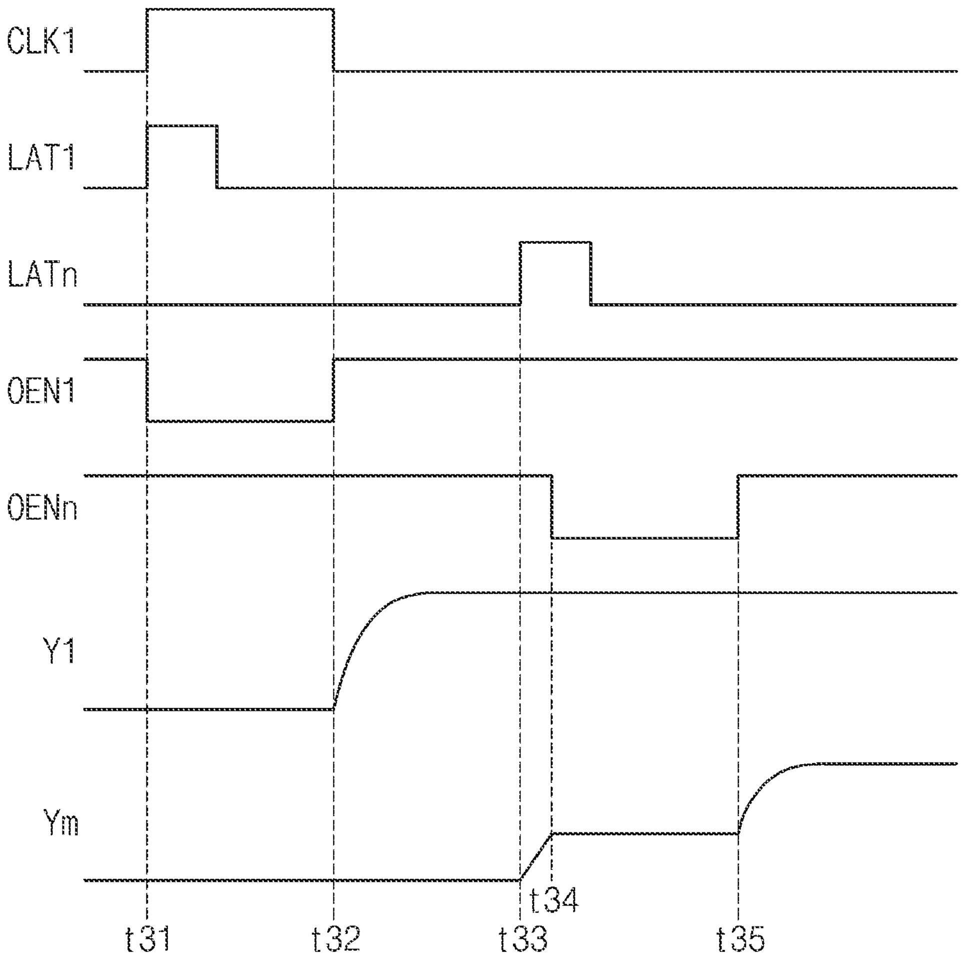
FIG. 8 is a timing diagram illustrating the operation of the first data driving circuit illustrated in FIG. 5 during the second operating mode.

FIG. 8 is a timing diagram illustrating the operation of the first data driving circuit DIC1 illustrated in FIG. 5 during the second operating mode.

Referring to FIGS. 4, 5, and 8, according to an embodiment, when the latch enable signal LAT1 transitions to the active level (e.g., a high level) at a 31st time point t31, the latch LT1 outputs the data signal D1 in the form of the first signal S1. The level shifter LS1 outputs a second signal S2 corresponding to the first signal S1. The digital-analog converter DA1 outputs a third signal S3 corresponding to the second signal S2. The amplifier AM1 outputs a fourth signal S4 corresponding to the third signal.

The output enable signal OEN1 transitions to an inactive level (e.g., a low level) at the 31st time point t31. While the output enable signal OEN1 is at an inactive level, the switch SW1 is maintained to be turned off.

When the output enable signal OEN1 transitions from an inactive level (e.g., a low level) to an active level (e.g., a high level) at a 32nd time point t32, the switch SW1 is turned on and the fourth signal S4 from the amplifier AM1 may be output in the form of the image signal Y1.

For example, the falling time of the output enable signals OEN1 and OENn may be delayed due to a delay on the signal path.

When the latch enable signal LATn transitions to the active level (e.g., the high level) at a 33th time point t33, and when the output enable signal OENn is maintained to be in an active level (e.g., a high level), a previous signal output from the amplifier AMm may be output in the form of an image signal Ym.

Even if the output enable signal OENn transitions from the active level (e.g., a high level) to the inactive level (e.g., a low level) at a 34th time point t34, the image signal Ym may be maintained to be a signal level which is not desired.

When the output enable signal OENn transitions from an inactive level (e.g., a low level) to an active level (e.g., a high level) at a 35th time point t35, the switch SWm is turned on and the data signal Dm may be output in the form of the image signal Ym.

In other words, the delay of the output enable signal OENn during the second operation mode may degrade the signal output characteristic of the first data driving circuit DIC1.

Figure 9:
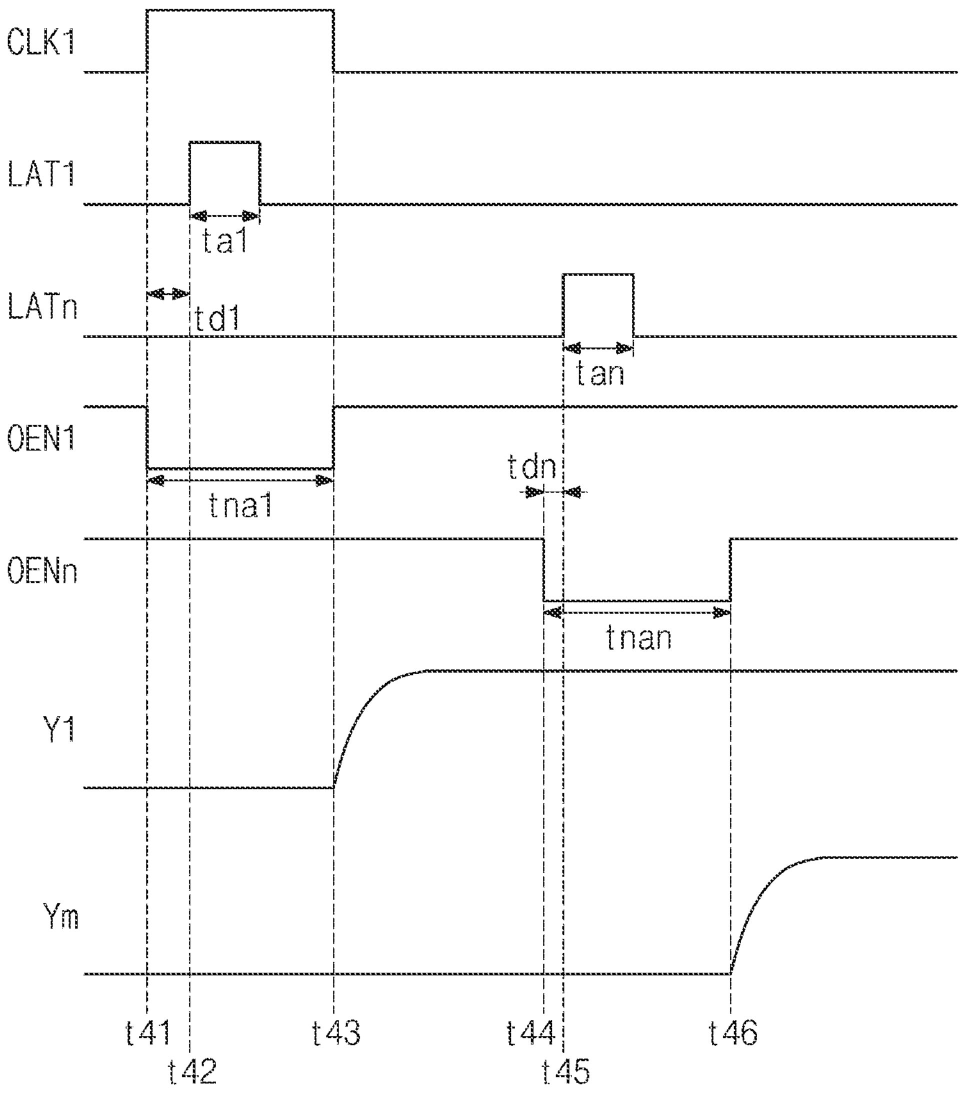
FIG. 9 is a timing diagram illustrating the operation of the first data driving circuit illustrated in FIG. 5 during the second operating mode.

FIG. 9 is a timing diagram illustrating the operation of the first data driving circuit DIC1 illustrated in FIG. 5 during the second operating mode.

Referring to FIGS. 4, 5, and 9, according to an embodiment, the signal generator SIG outputs the output enable signal OEN1 in the inactive level in response to the clock signal CLK1 at a 41st time point t41.

The signal generator SIG outputs the latch enable signal LAT1 in the active level (e.g., the high level) after a specific time is elapsed from a time point (that is the 41st time point t41) at which the output enable signals OEN1 transitions to the inactive level. According to an embodiment, the latch enable signal LAT1 may transition to the active level at a 42nd time point t42 that is obtained as the 41st time point t41 is elapsed by the first delay time td1.

When the latch enable signal LAT1 is in the active level, the latch LT1 outputs the data signal D1 in the form of the first signal S1. The level shifter LS1 outputs a second signal S2 corresponding to the first signal S1. The digital-analog converter DA1 outputs a third signal S3 corresponding to the second signal S2. The amplifier AM1 outputs a fourth signal S4 corresponding to the third signal.

During the inactive duration tna1 in which the output enable signals OEN1 is maintained to be in the inactive level, the switch SW1 is maintained to be turned off. According to an embodiment, the inactive duration tna1 in which the output enable signal OEN1 is maintained to be in the inactive level may be longer than the active duration ta1 of the latch enable signal LAT1. According to an embodiment, the inactive duration of the output enable signal OEN1 may be equal to the pulse width of the clock signal CLK1.

The signal generator SIG outputs the output enable signal OEN1 in the active level (for example, a high level) at a 43rd time point t43. When the switch SW1 is turned on in response to the output enable signals OEN1 in the active level, the fourth signal S4 from the amplifier AM1 may be output in the form of the image signal Y1.

The signal generator SIG may output the output enable signal OENn in the inactive level at a 44th time point t44.

The signal generator SIG outputs the latch enable signal LATn in the active level (e.g., the high level) after a specific time is elapsed from a time point (that is the 44th time point t44) at which the output enable signals OENn transitions to the inactive level. According to an embodiment, the latch enable signal LATn may transition to the active level at a 45th time point t45 that is obtained as the 44th time point t44 is elapsed by the n delay time tdn.

During the inactive duration than in which the output enable signals OENn is maintained to be in the inactive level, the switch SWn is maintained to be turned off. According to an embodiment, the inactive duration tnan in which the output enable signal OENn is maintained to be in the inactive level may be longer than the active duration tan of the latch enable signal LATn. According to an embodiment, the inactive duration tnan of the output enable signal OENn may be equal to the pulse width of the clock signal CLK1. According to an embodiment, the active duration ta1 of the latch enable signal LAT1 is not overlapped with the active duration tan of the latch enable signal LATn.

The signal generator SIG outputs the output enable signal OENn in the active level (e.g., a high level) at the 46th time point t46. When the switch SWm is turned on in response to the output enable signals OENn in the active level, the signal from the amplifier AMm may be output in the form of the image signal Ym.

According to an embodiment, the falling time of the output enable signals OEN1 and OENn may be delayed due to a delay on the signal path.

As illustrated in FIG. 9, when the output enable signal OEN1 shows a falling time delay greater than that of the output enable signal OENn, the n-th delay time tdn may be shorter than the first delay time td1.

In other words, even if the signal generator SIG generates the latch enable signals LAT1 and LATn such that the first delay time td1 is equal to the n-th delay time tdn, the first delay time td1 may be actually different from the n-th delay time tdn.

However, as illustrated in FIG. 9, even if the n-th delay time tdn is shorter than the first delay time td1, that is, even if the output enable signal OENn is delayed, the latch enable signal LATn transitions to the active level during the inactive duration than of the output enable signal OENn, thereby preventing the first data driving circuit DIC1 from erroneously operating.

According to an embodiment, the entire portion of the active duration ta1, in which the latch enable signal LAT1 is maintained to be in the active level, may be overlapped with the inactive duration tna1 in which the output enable signal OEN1 is maintained to be in the inactive level.

According to an embodiment, the entire portion of the active duration tan, in which the latch enable signal LATn is maintained to be in the active level, may be overlapped with the inactive duration than in which the output enable signal OENn is maintained to be in the inactive level.

The output enable signals OEN1 and OENn are maintained to be in the inactive level while the latches LT1 and LTm, the level shifters LS1 and LSM, the digital-analog converters DA1 and DAm, and the amplifiers AM1 and AMm are operating. Accordingly, the image signals Y1 and Ym having an undesirable level are prevented from being provided to the display panel DP (see FIG. 2).

The description has been made with reference to FIG. 9, regarding the operations of come components, which are latches LT1 and LTm, the level shifters LS1 and LSM, the digital-analog converters DA1 and Dam, and the amplifiers AM1 and AMm, in the first data driving circuit DIC1. Other components, such as latches LT2 to LTm-1, the level shifters LS2 to LSM-1, the digital-analog converters DA2 to Dam-1, and the amplifiers AM2 to AMm-1, in the first data driving circuit DIC1 may operate similarly to the latches LT1 to LTm, the level shifters LS1 and LSm, the digital-analog converter DA1 and DAm, and the amplifiers AM1 and AMm.

In addition, even the second to fourth data driving circuits DIC2, DIC3, and DIC4 illustrated in FIG. 4 may operate similarly to the first data driving circuit DIC1.

The data driving circuit of the display device having the above configuration may adjust a start timing of an active duration of a latch enable signal by matching the start timing of the active duration of the latch enable signal with a start timing of the inactive duration of an output enable signal. Particularly, the data driving circuit may adjust the start timing of the active duration of the latch enable signal such that the active duration of the latch enable signal is started after the inactive duration of the output enable signal is started. In this case, even if the falling edge of the output enable signal is delayed, the image signal output from the data driving circuit may be stably output. Accordingly, the display quality of the display device may be prevented from being degraded.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A data driving circuit comprising:

a latch circuit configured to latch a data signal in response to a latch enable signal and to output a first signal;

a level shifter configured to output a second signal obtained by changing a voltage level of the first signal;

a digital-analog converter configured to output a third signal obtained by converting the second signal into an analog signal;

an amplifier configured to output a fourth signal obtained by amplifying the third signal;

a switch configured to output the fourth signal in a form of an image signal, in response to an output enable signal; and a signal generator configured to generate the latch enable signal including an active duration and the output enable signal including an inactive duration, wherein the signal generator outputs a start timing of the active duration of the latch enable signal, such that the active duration of the latch enable signal starts after the inactive duration of the output enable signal starts.

2. The data driving circuit of claim 1, wherein the signal generator generates the latch enable signal and the output enable signal, such that the active duration of the latch enable signal starts after a first delay time is elapsed from a starting point of the active duration of the output enable signal.

3. The data driving circuit of claim 1, wherein an entire portion of the active duration of the latch enable signal is entirely overlapped with the inactive duration of the output enable signal.

4. The data driving circuit of claim 1, wherein the signal generator operates in a first operating mode and a second operating mode, wherein the signal generator maintains the output enable signal to be in an active level for the first operating mode, and wherein the switch is maintained to be turned on, in response to the output enable signal in the active level.

5. The data driving circuit of claim 4, wherein the signal generator outputs the output enable signal including the inactive duration and the latch enable signal including the active duration, in response to a clock signal, during the second operating mode.

6. The data driving circuit of claim 4, wherein the inactive duration of the output enable signal is longer than the active duration of the latch enable signal.

7. The data driving circuit of claim 1, wherein the latch circuit latches the data signal at a rising edge of the latch enable signal.

8. The data driving circuit of claim 1, wherein the switch outputs the fourth signal in a form of the image signal at a rising edge of the output enable signal.

9. A display device comprising:

a display panel;

a driving controller configured to provide a data signal and a clock signal; and a data driving circuit configured to provide an image signal to the display panel, in response to the data signal and the clock signal, wherein the data driving circuit includes:

a signal generator configured to generate a first latch enable signal including an active duration and a first output enable signal including an inactive duration; and a first circuit block configured to output the image signal corresponding to the data signal, in response to the first latch enable signal and the first output enable signal, and wherein the signal generator outputs a start timing of the active duration of the first latch enable signal, such that the active duration of the first latch enable signal starts after the inactive duration of the first output enable signal starts.

10. The display device of claim 9, wherein the first circuit block includes:

a latch circuit configured to latch the data signal in response to the first latch enable signal, and output a first signal;

a level shifter configured to change a voltage level of the first signal and to output a second signal;

a digital-analog converter configured to output a third signal obtained by converting the second signal into an analog signal;

an amplifier configured to amplify the third signal and to output a fourth signal; and a switch configured to output the fourth signal in a form of the image signal, in response to the first output enable signal.

11. The display device of claim 10, wherein the latch circuit latches the data signal at a rising edge of the first latch enable signal.

12. The display device of claim 10, wherein the switch outputs the fourth signal in a form of the image signal at a rising edge of the first output enable signal.

13. The display device of claim 10, wherein the signal generator operates in a first operating mode and a second operating mode, wherein the signal generator maintains the first output enable signal to be in an active level for the first operating mode, and wherein the switch is maintained to be turned on, in response to the first output enable signal in the active level.

14. The display device of claim 13, wherein an entire portion of the active duration of the first latch enable signal is entirely overlapped with the inactive duration of the first output enable signal during the second operating mode.

15. The display device of claim 13, wherein the signal generator outputs the first output enable signal including the inactive duration and the first latch enable signal including the active duration, in response to a clock signal during the second operating mode.

16. The display device of claim 15, wherein the inactive duration of the first output enable signal is longer than the active duration of the first latch enable signal during the second operating mode.

17. The display device of claim 9, wherein the signal generator generates the first latch enable signal and the first output enable signal, such that the active duration of the first latch enable signal starts after a first delay time is elapsed from a starting point of the inactive duration of the first output enable signal.

18. The display device of claim 9, further comprising:

a second circuit block configured to output the image signal corresponding to the data signal, in response to a second latch enable signal and a second output enable signal, wherein the signal generator additionally generates the second latch enable signal including the active duration and the second output enable signal including the inactive duration.

19. The display device of claim 18, wherein the signal generator adjusts a start timing of the active duration of the second latch enable signal, such that the active duration of the second latch enable signal starts after the inactive duration of the second output enable signal starts.

20. The display device of claim 19, wherein the active duration of the first latch enable signal is not overlapped with the active duration of the second latch enable signal.

* * * * *